United States Patent

Aksu

[15] 3,683,121

[45] Aug. 8, 1972

[54] INDICATING APPARATUS

[72] Inventor: Akin Aksu, 739 East 223rd St., Torrance, Calif. 90502

[22] Filed: Aug. 17, 1970

[21] Appl. No.: 64,496

[52] U.S. Cl. ..........179/84 C

[51] Int. Cl. ..........H04m 1/26

[58] Field of Search ..........179/84 L, 81 C, 84 C

[56] References Cited

UNITED STATES PATENTS

| | | | |
|---|---|---|---|
| 3,320,368 | 5/1967 | Applebaum | 179/84 L |
| 2,485,580 | 10/1949 | Ferrar | 179/84 L |
| 3,374,317 | 3/1968 | Chapin | 179/84 L |
| 3,050,592 | 8/1962 | Burgener | 179/84 L |

*Primary Examiner*—Kathleen H. Claffy
*Assistant Examiner*—William A. Helvestine
*Attorney*—Angus & Mon

[57] ABSTRACT

Apparatus according to the present disclosure is capable of indicating that a telephone has rung. The apparatus includes sensor means responsive to the ringing of a telephone. Indicator means is provided indicating that the telephone has been rung, and lock-in means is connected to the sensor means for operating the indicator means when the sensor means responds to the ringing of the telephone. Manually operable reset means is provided for removing the indication by the indicator. Preferably, the sensor means is an electrical transducer and the lock-in means is a switch capable of being set by a signal from the transducer.

4 Claims, 8 Drawing Figures

INVENTOR.
AKIN AKSU
BY Angus & Mon
ATTORNEYS.

INVENTOR.
AKIN AKSU
BY Angus & Mon
ATTORNEYS.

INDICATING APPARATUS

This invention relates to indicators, and particularly to devices for indicating that a telephone has rung.

There presently exists numerous companies which provide telephone answering services whereby a subscriber may leave his telephone unattended and the telephone answering service will receive telephone calls to the unattended telephone and take messages for the subscriber. When the subscriber returns to his telephone, he may call the answering service and be advised of the messages.

One problem associated with telephone answering services and the like resides in the fact that many subscribers call the telephone answering service only to learn that no messages were taken during the subscriber's absence from his telephone set. Often the telephone answering service had to review its records to ascertain the substance of the messages or the nonexistence of such messages as the case may be, and such review was time-consuming and costly to the efficient operation of the service. Some services, in fact, charge their subscribers for each inquiry as to messages in order to be compensated for such retrieval information from their records and message slips.

A need exists for a device which may be attached to a telephone set to indicate that the telephone had rung. Such a device would be particularly useful in connection with a telephone answering service for the purpose of indicating to a subscriber that his telephone set had been rung during his absence and that the answering service may have a message for him.

It is an object of the present invention to provide apparatus for indicating that an incoming telephone call had been attempted.

Another object of the present invention is to provide apparatus which may be attached to a standard telephone set and which provides an indication that the telephone has rung.

Another object of the present invention is to provide an indicator which may be attached to a telephone set of a subscriber of a telephone answering service so that the subscriber may ascertain whether his telephone has rung during his absence from the set.

Another object of the present invention is to provide an indicator operable by a telephone answering service to indicate to a subscriber that the service has a message for the subscriber.

In accordance with the present invention, an indicator is mounted in a housing adapted to be fastened to a telephone set. Means is provided which is responsive to the ringing of the telephone for operating the indicator. Reset means is provided for manually resetting the indicator.

In accordance with one feature of the present invention the housing may be removably attachable to a telephone set and the indicator operates independently of the telephone circuitry.

Another feature of the present invention resides in the provision of a circuit responsive to the ringing of a telephone for operating the indicator.

Yet another feature of the present invention resides in the provision of a tuned circuit responsive to an individual calling signals to operate the indicator.

The above and other features of this invention will be more fully understood from the following detailed description and the accompanying drawings, in which.

Figures 1, 2, 3, 4:
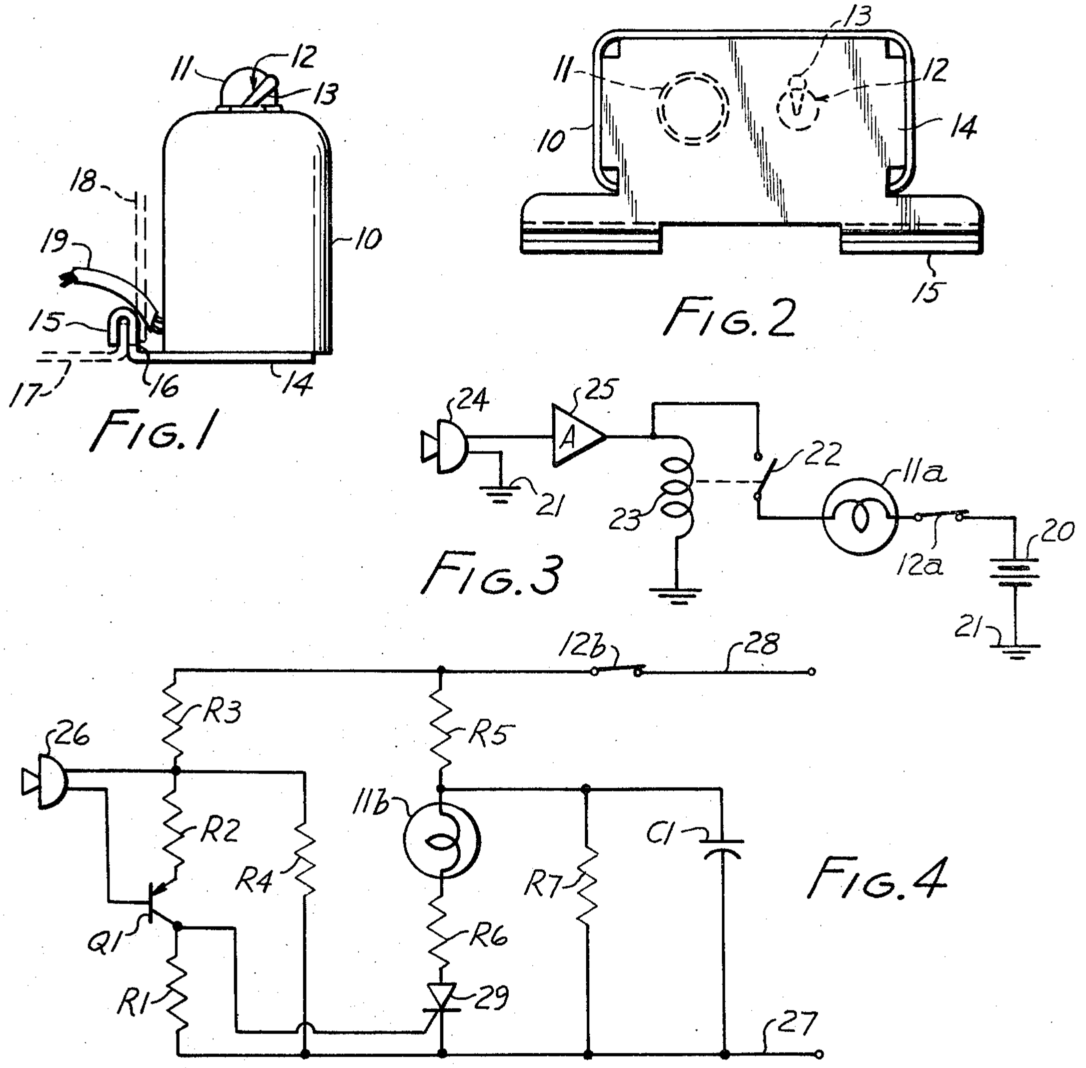
FIG. 1 is an end view of an indicator in accordance with the presently preferred embodiment of the present invention.
FIG. 2 is a bottom view of the apparatus illustrated in FIG. 1.
FIGS. 3, 4 and 5 illustrate modifications of circuit diagrams for operating an indicator in accordance with the present invention.

Referring to the drawings, and particularly to FIGS. 1 and 2 there is illustrated a housing 10 having an indicator lamp 11 affixed to, and protruding from, the upper surface thereof. Reset switch 12 having a manually operable switch operator 13 protrudes from the upper surface of housing 10. Housing 10 is mounted to plate 14 which in turn includes an extension portion having an upwardly extended inverted U-shaped bracket portion 15. As shown, particularly in FIG. 1, inverted U-shaped bracket 15 is adapted to receive an upwardly extending lip 16 of the base 17 of a standard telephone set. Side wall 18 of the telephone set, which is ordinarily constructed of plastic, is positioned over the U-shaped bracket 15 to hold the unit in place. If desired, set screws (not shown) may be provided to clamp one side of bracket 15 to lip 16 for fastening bracket 15 to lip 16. Cable 19 may be provided for providing electrical connection to the interior of housing 10 for the circuits illustrated in FIGS. 4 and 5.

FIG. 3 is a diagram of one form of a circuit for operation of the indicator illustrated in FIGS. 1 and 2. In FIG. 3 one side of indicator lamp 11*a* is connected via normally closed switch 12*a* to one side of battery 20, the opposite side of which is connected to ground 21, such as the chassis of housing 10 (FIG. 1). The opposite side of lamp 11*a* is connected through normally open relay contact 22 to one side of relay coil 23, the opposite side of which is connected to ground 21, Microphone 24 is positioned within housing 10 and is connected via amplifier 25 to the junction between contact 22 and relay coil 23. The opposite side of microphone 24 is connected to ground 21.

The circuit illustrated in FIG. 3 is entirely self-contained within housing 10 and is operable by a replacable battery 20, such as a standard flashlight battery, in the housing. Hence, cable 19 illustrated in FIG. 1 is not required in this embodiment.

In operation of the circuit illustrated in FIG. 3, if the telephone (not shown) should ring, the sound of the bell is sensed by microphone 24 which operates through amplifier 25 to energize coil 23. Relay coil operates to close contact 22 thereby providing a closed circuit for battery 20 through lamp 11*a* and coil 23. After the ring stops, relay coil 23 remains energized through closed contact 22. Likewise lamp 11*a* remains operating. To reset the device, switch 12*a* is manually opened to open the circuit to relay coil 23, thereby extinguishing the lamp and de-energizing coil 23. Reclosing of switch 12*a* will not re-energize lamp 11*a* due to the open condition of contact 22 and the de-energized condition of coil 23.

FIG. 4 illustrates another modification of a circuit for use with the indicator illustrated in FIGS. 1 and 2 wherein the collector of p-n-p transistor Q1 is connected via resistors R2 and R3 to one side of normally closed reset switch 12*b* whose opposite side is connected to lead 28. Microphone 26 is connected between the base of transistor Q1 and the junction between resistors R2 and R3. Resistor R4 is connected between lead 27 and the junction of resistor R2 and R3. Indicator lamp 11*b* is connected to switch 12*b* via resistor R5, and to the cathode of controlled rectifier 29 via resistor R6. The anode of controlled rectifier 29 is connected to lead 27, and the control gate of controlled rectifier 29 is connected to the collector of transistor Q1. Preferably, a filter, in the form of resistor R7 and capacitor C1 connected in parallel, is connected between the junction of lamp 11*b* and resistor R5 and lead 27. Preferably, controlled rectifier 29 is a silicon-controlled rectifier (SCR).

In operation of the circuit illustrated in FIG. 4, if the telephone should ring, microphone 26 senses the ringing of the telephone to bias transistor Q1 to an "on" or conducting condition thereby positively biasing the control gate of controlled rectifier 29. Controlled rectifier 29 then conducts thereby providing current through lamp 11*b* to operate the lamp. If the ringing should stop, controlled rectifier 29 continues conduction until the circuit is opened by switch 12*b*. Leads 27 and 28 may be connected via cable 19 (FIG. 1) to a suitable source of direct current (not shown) such as rectified alternating current.

When it is desired to halt the indication provided by lamp 11*b*, switch 12*b* is opened thereby disconnecting the power to control rectifier 29 and turning off lamp 11*b*. Reclosing switch 12*b* does not re-energize lamp 11*b* because controlled rectifier will not be switched on until ringing of the telephone is sensed.

Figure 5:
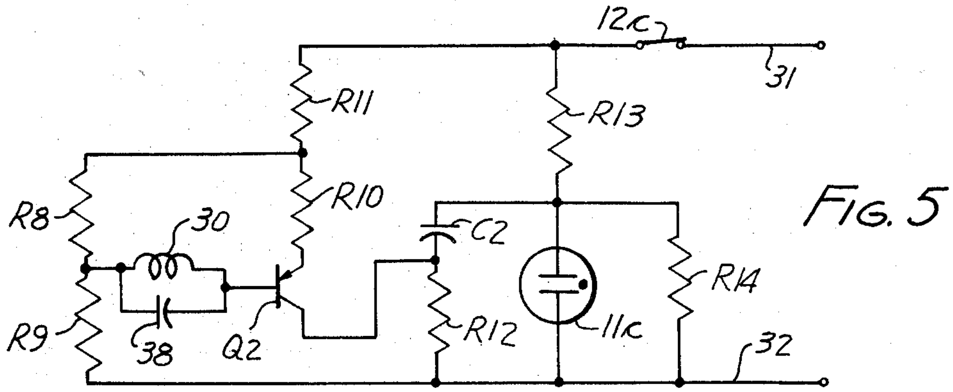

FIG. 5 illustrated another modification of a circuit for use in the indicator illustrated in FIGS. 1 and 2 wherein induction coil 30 has one side connected to the junction between resistors R8 and R9 and has its other side connected to the base of p-n-p transistor Q2. Tuning capacitor 38 may be connected in parallel with coil 30 to tune coil 30 to the signal in the ringing circuit of the telephone. The emitter of transistor Q2 is connected via resistor 10 and resistor R11 to one side of normally closed reset switch 12*c*, the opposite side of switch 12*c* being connected to lead 31. The junction between resistors R10 and R11 is also connected to resistor R8. The collector of transistor Q2 is connected via resistor R12 to lead 32 which is also connected to resistor R9. Indicator 11*c*, which in this case is a discharge lamp, such as a neon lamp, is connected on one side to lead 32 and is connected on the opposite side through resistor R13 to the one side of switch 12*c*. The junction between lamp 11*c* and resistor R13 is connected via capacitor C2 to the junction between resistor R12 and the collector of transistor Q2. Resistor R14 is connected in parallel with lamp 11*c*. Leads 31 and 43 may be connected through cable 19 (FIG. 1) to a source of direct current (not shown), such as rectified alternating house current.

In operation of the circuit illustrated in FIG. 5, resistors R8, R9, R10 and R12, together with transistor Q2 and coil 30 form a balanced Wheatstone bridge circuit, each leg of which, including resistor R12, has a voltage drop across it. The coil forms the center leg of the bridge. Capacitor C2 is ordinarily charged to some voltage through resistors R12 and R13. The arrangement of resistor R12 and capacitor C2 is such that capacitor C2 is charged to such voltage that the voltage across capacitor C2 raises to approximately 75 volts which is sufficient for sustaining operation of neon lamp 11*c* but is not enough to initiate the lamp.

Coil 30 and capacitor 38 are tuned to the frequency of the signal used by the telephone circuitry for ringing the telephone, for example, about 16 cycles per second. Thus, when a ringing current is impressed on the ringing circuit of the telephone, coil 30 senses the ringing current. The ringing current induces a current in coil 30 to unbalance the Wheatstone bridge. Transistor Q2 operates through resistors R10 and R11 to impose approximately 20 volts on the junction between capacitor C2 and resistor R12. The voltage across capacitor C2 raises to approximately 95 volts which is sufficient to initiate operation of the lamp. When the bridge circuit again stabilizes, whether due to readjustment of the voltage across each leg of the bridge or by ceasing of the ringing of the telephone, the voltage across capacitor C2 drops to approximately 75 volts which is sufficient for sustaining the operation of neon lamp 11*c*. When it is desired to reset the indicator, switch 12*c* is opened thereby disconnecting power to the indicator lamp thereby turning off the lamp. Reclosing of switch 12 will not reinitiate lamp 11*c* because the initiation voltage is not supplied to the lamp.

Figure 6:
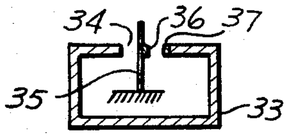
FIG. 6 is a schematic representation of a mechanical indicator in accordance with the present invention.

FIG. 6 illustrates another modification of the present invention wherein a mechanical indicator is provided. In FIG. 6 housing 10 is schematically illustrated as housing 33. Housing 33 has an opening 34 through which tuned reed 35 extends. Tuned reed 35 is mounted within housing 33 and is responsive to the ringing circuit of the ringing telephone to vibrate. Reed 35 carries permanent magnet 36 which is adapted to be drawn against magnet 37 on housing 33 when reed 35 vibrates. In operation of the indicator arrangement illustrated in FIG. 6, when the telephone rings, reed 35 vibrates causing attraction between magnets 36 and 37 so that reed 35 is drawn to one side of opening 34 (to the right as illustrated in FIG. 6), thereby providing an indication that the telephone has rung. When the ringing ceases, the magnets continue to hold the indicator reed. The apparatus may be reset by merely moving the reed manually back to its center position.

The apparatus according to the present invention thus provides sensor means such as a microphone, tuned reed, or induction coil, which is responsive to the telephone ring to operate an indicator. In the case of a tuned reed, the position of the reed itself is the indicator, while in the electrical embodiments, a lamp is provided. Resettable lock-in means is provided to retaining the indication upon completion of the telephone ring. For example, a relay or a controlled rectifier may be used to hold the indicator, or a gas discharge tube may be used as a lock-in type indicator. In the case of the mechanical embodiment, magnets are used for locking in the indicator. It is to be understood that the microphone sensitive to the sound produced by the ringing circuit of the telephone may be substituted for an induction coil responsive to the current used to operate the ringing circuit of the telephone and vice versa.

Figure 7:
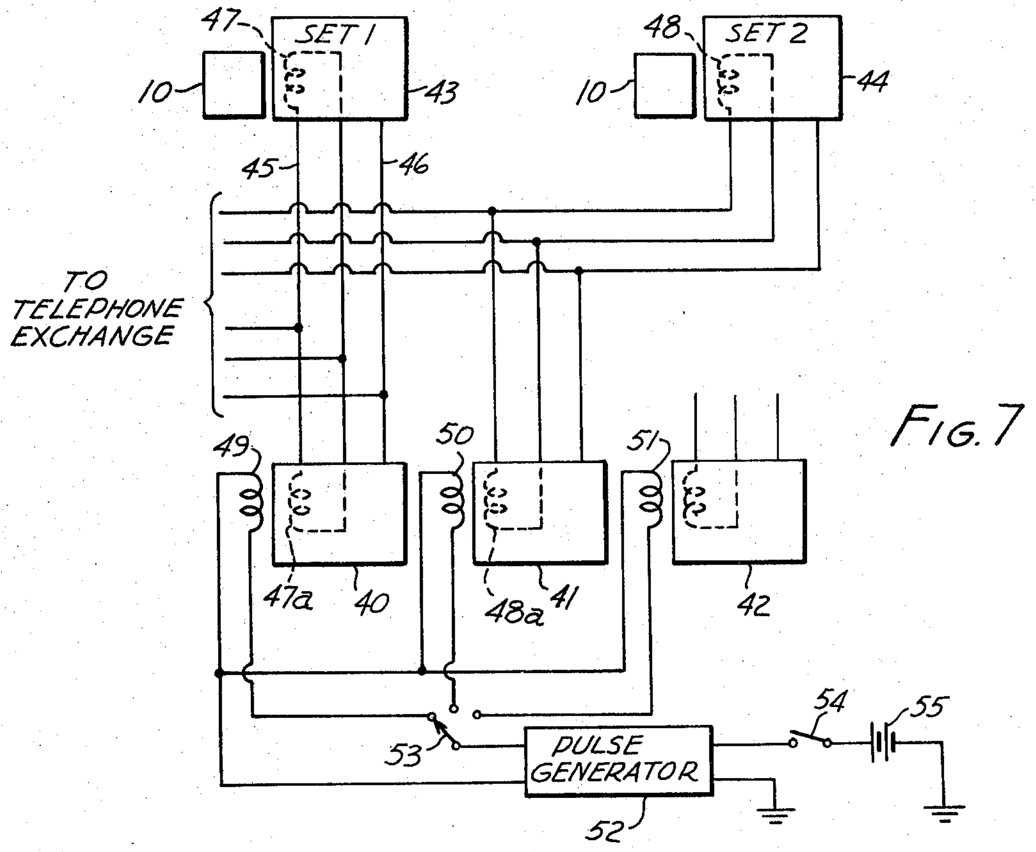
FIG. 7 is a block circuit diagram of a modification of apparatus according to the present invention.
Figure 8:
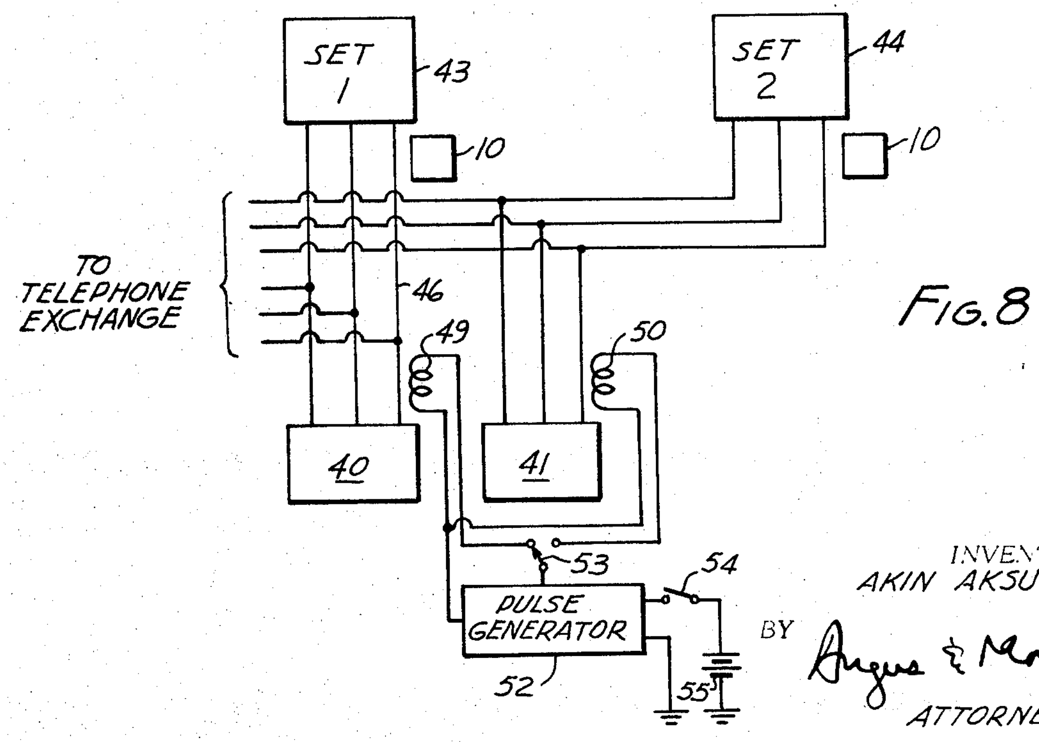

FIGS. 7 and 8 are block circuit diagrams of systems enabling the operator at a telephone answering service to selectively indicate to a subscriber that the answering service has a message for such subscriber. The system illustrated in FIG. 7 is particularly useful where the apparatus at the answering service includes a ringing coil connected in parallel to the ringing coil at the telephone set of each subscriber whereas the circuit illustrated in FIG. 8 is particularly useful wherein ringing coils are not provided at the answering service.

In the system shown in FIG. 7, the answering service includes a plurality of telephone sets 40, 41 and 42 each connected in parallel with individual telephone sets 43, 44 of individual subscribers. The ringing coil 47 of subscriber's set 43 is connected via lead 45 to the ringing coil 47*a* of the telephone answering service as well as to the ringing circuit of the telephone exchange. Likewise, the communications circuit 46 of set 43 is connected to the communications circuit of the telephone exchange as well as the communications circuit of set 40. Telephone set 44 is connected to set 41 in the same manner, and so on. Indicator apparatus 10 is mounted to the telephone sets 43 and 44 adjacent the ringing coils 47 and 48, respectively. Preferably, the indicator apparatus 10 includes the circuit illustrated in FIG. 5 which has heretofore been described in detail. Induction coils 49, 50 and 51 have one have one side connected together and to pulse generator 52 and have their other side connected to respective remote contacts of switch 53 whose center contact is likewise connected to pulse generator 52. Pulse generator 52 is connected via manually operable switch 54 to source of potential 55.

The sensor in each of the indicator circuits associated with indicators 10 adjacent sets 43 and 44 are each tuned to a frequency dependent upon the frequency of the output of pulse generator 52, and preferably not a harmonic of the ringing frequency of the telephone circuit. In this regard, capacitor 38 and coil 30 in the circuit illustrated in FIG. 5 are tuned to the frequency of the signal produced by pulse generator 52.

In operation of the system illustrated in FIG. 7, if a telephone call is attempted to a subscriber and the subscriber does not answer the call, the answering service intercepts the telephone call and records the message, if any. It is possible that the caller may not desire to leave a message, but if the caller does leave a message, the operator can selectively initiate the indicator associated with such subscriber's set by operating switch 53 to connect pulse generator 52 to the coil 49, 50 or 51 associated with the telephone set of the particular subscriber. Thereafter, the operator manually operates switch 54 to operate pulse generator 52 thereby inducing a signal having a predetermined frequency into the ringing circuit of the telephone set of the particular subscriber. The predetermined signal is detected by the sensor associated with the circuit in indicator apparatus 10 to operate the indicator as heretofore described.

The apparatus illustrated in FIG. 8 is similar to the apparatus illustrated in FIG. 7 except that instead of operating on the ringing circuit, the apparatus operates on the communications circuit. Hence, coil 49 or 50 is operated by means of pulse generator 52 in a manner heretofore described in connection with selector switch 53 to induce a predetermined signal into the communication circuit, such as circuit 46. Indicator apparatus 10 at each subscriber's set is closely associated with the communications circuit so that upon receipt of the predetermined signal on the communications circuit, the sensor in indicator 10 detects the predetermined signal from pulse generator to operate the indicator.

The present invention thus provides apparatus for indicating that a telephone has been rung. The apparatus is particularly useful in connection with telephone answering services wherein a subscriber to such service, upon return to his previously unattended telephone set, may determine whether or not any incoming telephone calls have been attempted during his absence. The apparatus may be economically produced, and the use of the apparatus represents a substantial savings in the operation of telephone answering services, both to the subscriber as well as to the service bureau. Thus, with apparatus in accordance with the present invention attached to telephone sets serviced by a telephone answering service, the subscriber can ascertain at a glance whether the telephone answering service may have a message for him taken during his absence from the set. Also, the apparatus may be in such a manner that the answering service may directly initiate the indicator apparatus at any particular subscriber to indicate to the subscriber that it has a message for such subscriber.

This invention is not to be limited by the embodiments shown in the drawings and described in the description, which are given by way of example and not of limitation, but only in accordance with the scope of the appended claims.

What is claimed is:

1. Indicator apparatus comprising: a housing; sensor means carried by said housing for sensing receipt from a telephone set of a predetermined signal; indicator means carried by said housing and operable by said sensor means for indicating receipt of said predetermined signal; means connected to said sensor means for holding said indicating means in its indicating mode in response to operation of said sensor; and manually operable reset means carried by said housing and connected to said holding means, said reset means being operable to cease indication by said indicator means said sensor means comprising electrical transducer means responsive to the operation of the ringing circuit of a telephone to produce a signal, said indicator means comprising a lamp whose operation is capable of being initiated by a first potential and capable of being sustained by a second potential, said first potential being greater than said second potential, a capacitor, said hold means comprising a charging circuit for charging said capacitor to a potential at least as great as said second potential but not as great as said first potential, means connecting said capacitor to said lamp, and means responsive to the operation of said transducer means for biasing said capacitor to impose a potential on said lamp at least as great as said first potential, said lamp being connected in parallel with a series circuit comprising said capacitor and a resistor, said sensor means being connected to the junction between said resistor and capacitor, and connecting means for connecting said lamp to a source of potential.

2. Apparatus according to claim 1 wherein said sensor means comprises a Wheatstone bridge connected to said connector means, said resistor forming one leg of said Wheatstone bridge and said transducer means forming the center leg of said Wheatstone bridge.

3. Apparatus according to claim 2 wherein said transducer means includes a microphone responsive to the sound produced by the ringing circuit of the telephone.

4. Apparatus according to claim 3 wherein said reset means comprises a manually operable normally closed switch connected to said connecting means.

* * * * *

UNITED STATES PATENT OFFICE

CERTIFICATE OF CORRECTION

Patent No. 3,683,121 Dated August 8, 1972

Inventor(s) ______

It is certified that error appears in the above-identified patent and that said Letters Patent are hereby corrected as shown below:

Col. 2, line 10 Cancel "and";

Col. 2, line 12 Cancel the period and substitute --; and--;

Col. 2, line 12 After line 12, insert the following paragraph:
--Fig. 8 is a block diagram of another modification of apparatus according to the present invention.--

Col. 2, line 61 After the sentence ending "22." insert the following sentence: --This arrangement is referred to herein as a lock-in or holding means.--

Col. 2, line 39 Change "illustrated" to --illustrates--;

Col. 3, line 48 Change "10" to --R10--;

Col. 3, line 54 After "Indicator" insert --lamp--;

Col. 3, line 62 Change "43" to --32--.

Col. 4, line 27 After "sustaining" insert --or holding--;

Col. 4, line 28 After the sentence ending "11c" insert the following sentence: --This arrangement is therefore a holding means for holding the lamp in operation.--

FORM PO-1050 (10-69)

USCOMM-DC 60376-P69
★ U.S. GOVERNMENT PRINTING OFFICE : 1969 O—366-334

UNITED STATES PATENT OFFICE
CERTIFICATE OF CORRECTION

Patent No. 3,683,121 Dated August 8, 1972

Inventor(s) AKIN AKSU

It is certified that error appears in the above-identified patent and that said Letters Patent are hereby corrected as shown below:

| | |
|---|---|
| Col. 4, line 30 | After the sentence ending "lamp." insert the following sentence: --Hence switch 12c is a resetting means.-- |
| Col. 6, line 44 | After "signal;" insert --holding--; |
| Col. 6, line 49 | After "indicator means" insert a comma. |
| Col. 7, line 5 | Change "connector" to --connecting--. |

Signed and sealed this 6th day of February 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
★ U.S. GOVERNMENT PRINTING OFFICE : 1969 O—366-334